(No Model.)
N. OLEY.
Horse Holding Device for Vehicles.
No. 235,282.  Patented Dec. 7, 1880.
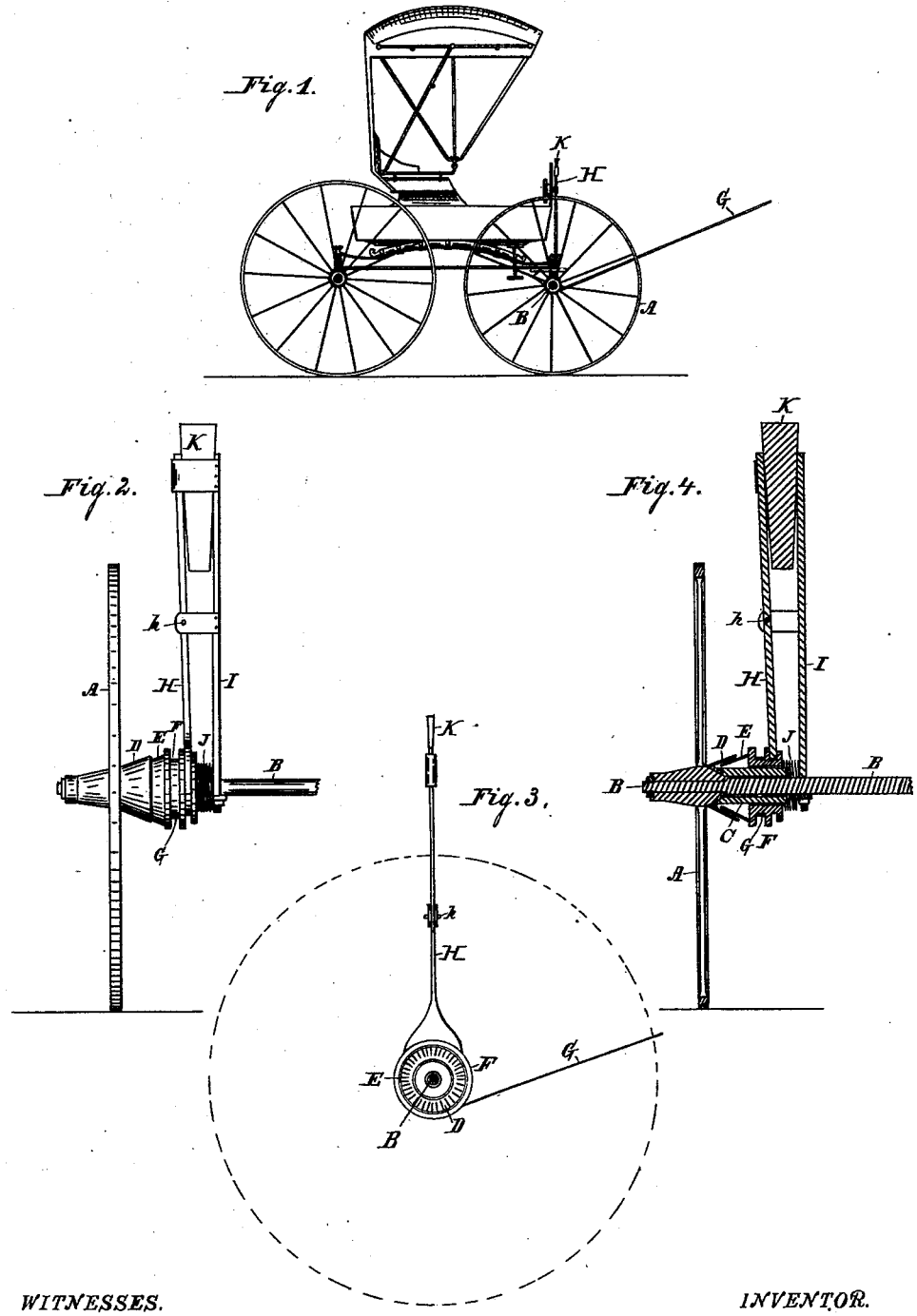
WITNESSES.  INVENTOR.

UNITED STATES PATENT OFFICE.

NICKOLAS OLEY, OF INDIANAPOLIS, INDIANA, ASSIGNOR OF ONE-HALF TO CHARLES LAGLER, OF SAME PLACE.

HORSE-HOLDING DEVICE FOR VEHICLES.

SPECIFICATION forming part of Letters Patent No. 235,282, dated December 7, 1880.

Application filed August 31, 1880. (No model.)

*To all whom it may concern:*

Be it known that I, NICKOLAS OLEY, of the city of Indianapolis, county of Marion, and State of Indiana, have invented certain new and useful Improvements in Devices for Stopping and Holding Runaway and Other Teams, of which the following is a specification.

The object of my said invention is to produce a device by means of which runaway teams may be caused to stop themselves, and by means of which all teams may be securely held and prevented from starting. This object is accomplished by attaching a clutch to the vehicle—one part to the axle-tree and the other to one of the wheels of the vehicle—and providing one part of said clutch with means by which the same may be operated, and a pulley upon which the hitching-strap winds, all as will hereinafter be more particularly set forth.

Referring to the accompanying drawings, Figure 1 is a side elevation of a buggy to which my invention is applied; Fig. 2, a front elevation of the wheel and a portion of the axle with my invention thereon. Fig. 3 is a side elevation of the same with the wheel removed, and Fig. 4 is a central vertical section of Fig. 2.

In said drawings the portions marked A represent the wheel of the vehicle; B, the axle-tree; C, a hollow shaft or sleeve attached to the hub of the wheel and extending out over the axle-tree; D, the portion of the clutch which is attached to the wheel; E, the portion of the clutch which is upon the hollow shaft or sleeve C, or upon the axle; F, a pulley, which is made rigid with the clutch portion E; G, a strap attached to, and adapted to be wound upon, said pulley; H, a lever or shifting-bar, by which said pulley is operated; I, a standard to which said shifting-bar is pivoted; J, a spring, which, when the pulley is not forced back by the shifting-bar, forces it, and with it the clutch part E, toward the wheel, and thus causes said clutch to become engaged, and, together with the pulley, to turn with said wheel; and K, a wedge inserted between the standard and shifting-bar, by means of which the clutch is forced apart at all times, except when said wedge is removed.

The operation of my invention is as follows: The strap G is divided at its outer or loose end, and the branches passed through the terrets on the saddle of the harness, after the usual manner of reins, and attached to the bridle-bit. The other end being attached to the pulley, it is, of course, wound up when the pulley revolves, and thus pulls back upon the bit and stops the horse or other animal attached to the vehicle. The lever or shifting-bar H operates to throw and hold the clutch out of engagement, and the spring J forces it into engagement when the means of holding it apart are removed. The wedge K operates to hold the shifting-bar in position during the time the latter is holding the clutches apart.

I prefer to make the clutch, as shown, of two smooth conical forms, one of which shall fit into the other; but of course a cogged or other form of clutch would accomplish substantially the same result.

The shifting-bar may, if desired, be replaced by a strap or cord running under a slide or pulley and up to a point where it can be easily reached and held by a suitable fastening, or the shifting-bar shown may be replaced by another operated and fastened differently.

The hollow shaft C, where the axle-tree is of suitable form, may be dispensed with and the clutch part and pulley mounted directly on the axle. I do not, however, consider that such changes would be beyond the scope of my invention, but expect to make them, if found expedient.

Having thus fully described my said invention, what I claim as new, and desire to secure by Letters Patent, is—

1. The combination of the wheel A, having clutch part D, the axle B, having the upright rigid bar I mounted thereon, the shifting-bar H, pivoted to the upright I, the clutch part E, arranged to be operated by the shifting-bar, the spring J, by which the part E is forced into engagement with the part D, and the wedge K, by which the bar H is enabled to hold the part E away from the part D, when all arranged and operating substantially as herein shown and specified.

2. The combination of the wheel A, having clutch part D, and hollow axle or sleeve C, attached thereto, the clutch part E, the pulley F, the strap G, the shifting-bar H, and the spring J, substantially as and for the purposes set forth.

In witness whereof I have hereunto set my hand and seal at Indianapolis, Indiana, this 28th day of August, A. D. 1880.

NICKOLAS OLEY. [L. S.]

In presence of—
 C. BRADFORD,
 CHAS. LAGLER.